US009878500B2

(12) United States Patent
Schmitt et al.

(10) Patent No.: US 9,878,500 B2
(45) Date of Patent: Jan. 30, 2018

(54) COMPOSITE SEMIFINISHED PRODUCTS, MOLDED PARTS PRODUCED THEREFROM, AND MOLDED PARTS PRODUCED DIRECTLY BASED ON HYDROXY-FUNCTIONALIZED (METH)ACRYLATES, WHICH ARE CROSS-LINKED BY MEANS OF URETDIONES IN A THERMOSETTING MANNER

(75) Inventors: Guenter Schmitt, Darmstadt (DE); Sandra Reemers, Muenster (DE); Emmanouil Spyrou, Schermbeck (DE); Heike Heeb, Erlensee (DE); Stephan Kohlstruk, Duelmen (DE); Friedrich Georg Schmidt, Haltern am See (DE); Elke Gollan, Herne (DE)

(73) Assignee: Evonik Degussa GmbH, Essen (DE)

( * ) Notice: Subject to any disclaimer, the term of this patent is extended or adjusted under 35 U.S.C. 154(b) by 671 days.

(21) Appl. No.: 13/978,059

(22) PCT Filed: Dec. 1, 2011

(86) PCT No.: PCT/EP2011/071450
§ 371 (c)(1),
(2), (4) Date: Aug. 21, 2013

(87) PCT Pub. No.: WO2012/093006
PCT Pub. Date: Jul. 12, 2012

(65) Prior Publication Data
US 2013/0323993 A1 Dec. 5, 2013

(30) Foreign Application Priority Data
Jan. 4, 2011 (DE) .......................... 10 2011 002 418

(51) Int. Cl.
B29C 70/06 (2006.01)
C08J 5/24 (2006.01)

(52) U.S. Cl.
CPC ................ B29C 70/06 (2013.01); C08J 5/24 (2013.01); Y02B 10/30 (2013.01); Y10T 442/20 (2015.04); Y10T 442/2762 (2015.04); Y10T 442/2861 (2015.04); Y10T 442/2984 (2015.04); Y10T 442/2992 (2015.04)

(58) Field of Classification Search
USPC ........... 428/308.4, 319.3, 339; 442/117, 152, 442/164, 179, 180; 427/339; 156/307.1; 264/257
See application file for complete search history.

(56) References Cited

U.S. PATENT DOCUMENTS

| | | | |
|---|---|---|---|
| 5,009,949 A * | 4/1991 | Tanaka .................. | C08F 265/04 442/117 |
| 6,008,150 A | 12/1999 | Thyssen et al. | |
| 6,475,253 B2 * | 11/2002 | Culler .................... | B24D 3/28 428/323 |
| 8,455,090 B2 | 6/2013 | Schmidt et al. | |
| 8,741,978 B2 * | 6/2014 | Moy ..................... | B29C 70/50 428/308.4 |
| 2012/0003890 A1 | 1/2012 | Schmidt et al. | |
| 2012/0003891 A1 | 1/2012 | Schmidt et al. | |
| 2012/0289657 A1 | 11/2012 | Hilf et al. | |
| 2012/0309895 A1 | 12/2012 | Schmidt et al. | |
| 2013/0012108 A1 * | 1/2013 | Li ........................ | B24D 3/344 451/59 |
| 2013/0045652 A1 | 2/2013 | Schmidt et al. | |
| 2013/0078417 A1 | 3/2013 | Schmidt | |
| 2013/0172480 A1 | 7/2013 | Schmidt et al. | |
| 2013/0230716 A1 | 9/2013 | Schmidt et al. | |
| 2013/0303678 A1 | 11/2013 | Hilf et al. | |
| 2014/0065911 A1 | 3/2014 | Schmidt et al. | |
| 2014/0163165 A1 | 6/2014 | Schmidt et al. | |

FOREIGN PATENT DOCUMENTS

| | | |
|---|---|---|
| DE | 44 41 765 | 5/1996 |
| JP | 2006-45404 | 2/2006 |
| WO | 2010 108701 | 9/2010 |
| WO | 2010 108723 | 9/2010 |
| WO | 2011 147688 | 12/2011 |

OTHER PUBLICATIONS

Internatinal Search Report dated Apr. 26, 2012 in PCT/EP11/71450 Filed Dec. 1, 2011.
U.S. Appl. No. 13/825,728, filed Mar. 22, 2013, Schmidt, et al.
U.S. Appl. No. 13/824,084, filed May 20, 2013, Schmidt, et al.
U.S. Appl. No. 13/824,064, filed May 9, 2013, Schmidt, et al.
U.S. Appl. No. 14/360,442, filed May 23, 2014, Schmidt, et al.
U.S. Appl. No. 14/774,395, filed Sep. 10, 2015, Spyrou, et al.
Combined Taiwanese Office Action and Search Report dated Jul. 13, 2015 in Patent Application No. 101100046 (with English Translation).
U.S. Appl. No. 14/685,162, filed Apr. 13, 2015, Spyrou, et al.
U.S. Appl. No. 14/705,485, filed May 6, 2015, Stapperfenne, et al.
U.S. Appl. No. 14/705,563, filed May 6, 2015, Stapperfenne, et al.
Notification of Reasons for Refusal dated Dec. 14, 2015 in Japanese Patent Application No. 2013-547830 (submitting English translation only).
U.S. Appl. No. 14/007,585, filed Sep. 25, 2013, Spyrou, et al.

* cited by examiner

Primary Examiner — Lynda Salvatore
(74) Attorney, Agent, or Firm — Oblon, McClelland, Maier & Neustadt, L.L.P.

(57) ABSTRACT

Provided is a prepreg composed of a fibrous substrate impregnated with a reactive or highly reactive polymer composition as a matrix material. The reactive or highly reactive polymer composition contains a (meth)acrylate-based resin comprising at least one of a hydroxyl group, an amine group, a thiol group, an initiator and/or accelerator, and a di- or polyisocyanate which has been internally capped, capped with a capping agent, or a combination thereof. The (meth)acrylate-based resin contains from 20% by weight to 70% by weight of at least one (meth)acrylate monomer and from 1% by weight to 50% by weight of at least one prepolymer.

19 Claims, No Drawings

COMPOSITE SEMIFINISHED PRODUCTS, MOLDED PARTS PRODUCED THEREFROM, AND MOLDED PARTS PRODUCED DIRECTLY BASED ON HYDROXY-FUNCTIONALIZED (METH)ACRYLATES, WHICH ARE CROSS-LINKED BY MEANS OF URETDIONES IN A THERMOSETTING MANNER

FIELD OF THE INVENTION

The invention relates to a process for producing polyurethane prepregs which are stable during storage, and to mouldings (composite components) produced therefrom. The prepregs or components are produced by mixing (meth)acrylate monomers, (meth)acrylate polymers, hydroxy-functionalized (meth)acrylate monomers and/or hydroxy-functionalized (meth)acrylate polymers with uretdione materials and moreover with aromatic amines which accelerate a free-radical polymerization reaction. This mixture or solution is applied by known processes to fibre material, e.g. carbon fibres, glass fibres or polymer fibres, and is polymerized at room temperature or higher temperatures with the aid of initiators, e.g. dibenzoyl peroxide. Instead of amine acceleration and subsequent hardening with initiators, it is also possible to use other known room-temperature curing systems, e.g. permaleate systems.

Polymerization, e.g. at room temperature or at up to 80° C., gives thermoplastics or, respectively, thermoplastic prepregs which can subsequently be subjected to forming processes. By using elevated temperature, the hydroxy-functionalized acrylate constituents can then be crosslinked with the uretdiones already present in the system. It is thus possible to produce dimensionally stable thermosets and, respectively, crosslinked composite components.

Fibre-reinforced materials in the form of prepregs are already used in many industrial applications because they are convenient to handle and provide increased processing efficiency in comparison with the alternative wet-lay-up technology.

Industrial users of such systems demand not only faster cycle times and greater stability during storage at temperatures including room temperature, but also a method for cutting the prepregs to size which, during automated cuting-to-size and lay-up of the individual prepreg layers, avoids contamination of the cutting tools with the matrix material, which is often tacky.

Various shaping processes, e.g. the reaction-transfer-moulding (RTM) process, include the introduction of the reinforcing fibres into a mould, closing of the mould, introduction of the crosslinkable resin formulation into the mould and subsequent crosslinking of the resin, typically through heating.

One of the limitations of this type of process is that it is relatively difficult to place the reinforcing fibres into the mould. The individual layers of the woven fabric or laid scrim must be cut to size and adapted appropriately for the various shapes of the moulds. This can be both time-consuming and complicated, particularly if the mouldings are also intended to comprise foam cores or other cores. It would be desirable here to have preformable fibre reinforcement together with simple handling and with existing scope for forming processes.

PRIOR ART

Within the field of crosslinking matrix systems there are a number of specialized resins as well as polyesters, vinyl esters and epoxy systems. Among these are polyurethane resins, which are in particular used to produce composite profiles by way of pultrusion processes, because they are tough and strong and tolerate adverse conditions. A disadvantage frequently mentioned is that the isocyanates used are toxic. However, epoxy systems and the hardener components used therein can also be criticized on grounds of toxicity, in particular in relation to known sensitivities and allergies.

Prepregs and composites produced therefrom based on epoxy systems are described by way of example in WO 98/50211, EP 309 221, EP 297 674, WO 89/04335 and U.S. Pat. No. 4,377,657. WO 2006/043019 describes a process for producing prepregs based on epoxy resin-polyurethane powders. There are also known prepregs based on pulverulent thermoplastics as matrix.

WO 99/64216 describes prepregs and composites and a method for producing these, where emulsions are used with polymer particles sufficiently small to permit sheathing of individual fibres. The viscosity of the polymers of the particles is at least 5000 centipoise, and these are either thermoplastics or crosslinking polyurethane polymers.

EP 0590702 describes powder impregnation systems for producing prepregs where the powder is composed of a mixture made of a thermoplastic and of a reactive monomer or, respectively, prepolymers. WO 2005/091715 likewise describes the use of thermoplastics for producing prepregs.

There are also known prepregs with a matrix based on 2-component polyurethanes (2C PUs). The 2C PU category in essence comprises the traditional reactive polyurethane resin systems. The system here is in principle made of two separate components. The most important constituent of one of the components is always a polyisocyanate, e.g. polymeric methylenediphenyl diisocyanates (MDI), and the most important constituents of the second component are polyols or else, in more recent developments, amino- or amine-polyol mixtures. The two components are mixed with one another only briefly prior to processing. Chemical hardening then takes place through polyaddition with formation of a network made of polyurethane or polyurea. 2-Component systems have limited pot life (shelf life) after mixing of the two constituents, since the onset of reaction leads to gradual increase of viscosity and finally to gelling of the system. A large number of variables determine the effective processability time of the system here, reactivity of the reactants, catalysis, concentration, solubility, moisture content, NCO/OH ratio and ambient temperature being the most important [in which connection see: Lackharze [Coating resins], Stoye/Freitag, Hauser-Verlag 1996, pages 210/212]. The disadvantage of prepregs based on 2C PU systems of this type is that the time available for processing the prepreg to give a composite is only brief. Prepregs of this type are not therefore stable during storage for a number of hours, and are certainly not stable during storage for a number of days.

Except for the different binder basis, the constitution of moisture-curing coatings corresponds substantially to that of analogous 2C systems, and this is also true for their properties. The solvents, pigments, fillers and auxiliaries used are in principle the same. These systems differ from 2C coatings in that, for reasons of stability, they tolerate no moisture of any kind prior to their application.

DE 102009001793.3 and DE 102009001806.9 describe a process for producing prepregs which are stable during storage and are in essence composed of A) at least one fibrous substrate and B) at least one reactive pulverulent polyurethane composition as matrix material.

The systems here can also comprise poly(meth)acrylates as cobinders or polyol component. DE 102010029355.5 uses a direct melt impregnation process to introduce compositions of this type into the fibre material. DE 102010030234.1 achieves this by pretreatment with solvents. These systems are disadvantageous because of high melt viscosity or, respectively, the use of solvents which then have to be removed, and they can have also have toxicological disadvantages.

OBJECT

In the light of the prior art, the object of the present invention was to provide a new prepreg technology which can provide a simpler process for producing prepreg systems which have no handling problems, i.e. are not toxic.

A particular object of the present invention was to provide a process which can produce prepregs and which can give, in comparison with the prior art, stability during a markedly increased storage time and/or can give a markedly increased pot life (shelf life). A further intention is that the handling of the prepregs be improved over, or at least comparable with, the prior art.

For production of the prepregs, it would be advantageous if the viscosity of preparations of the uncrosslinked matrix materials were sufficiently low to ensure wetting of the fibrous substrate with a sufficient proportion of the fibres by volume during production of the composite component, and thixotropic properties can also be advantageous here, so that it is possible to inhibit flow of the resin away from vertical component segments.

ACHIEVEMENT OF OBJECT

The objects are achieved by means of a novel combination of (meth)acrylate resins with uretdiones. The advantage of this system of the invention consists in production of a thermoplastic semifinished product/prepreg which can be subjected to forming processes and which is crosslinked to give a thermoset in a further step during the production of the composite components. The starting formulation is liquid and therefore suitable for the impregnation of fibre material without addition of solvents. The semifinished products are stable during storage at room temperature. The heat resistance of the resultant mouldings is greater than that of other polyurethane systems. They have higher flexibility than familiar epoxy systems. Matrices of this type can moreover be designed to be lightfast and they are therefore used for production of carbon-faced components with no further coating.

Surprisingly, it has been found possible to produce adequately impregnated, reactive composite semifinished products which are stable during storage by using the abovementioned combination of a reactive (meth)acrylate resin and an isocyanate component.

The resultant composite semifinished products have processing properties which are least the same as, or else even better than, those of the prior art, and can be used to produce high-performance composites for a very wide variety of applications for the construction industry, automobile industry, aerospace industry, and energy technology (wind-power systems) and for boatbuilding and shipbuilding. The reactive compositions that can be used according to the invention are environmentally friendly and inexpensive, and have good mechanical properties, are easy to process and, after curing, have good weathering resistance, for example having a balanced ratio of hardness to flexibility.

For the purposes of this invention, the expression composite semifinished products is used synonymously with the expressions prepreg and organopanel. A prepreg is generally a precursor for thermoset composite components.

An organopanel is normally a corresponding precursor for thermoplastic composite components.

In particular, the objects are achieved through novel composite semifinished products which are in essence composed of A) at least one fibrous substrate and
B) at least one reactive or highly reactive polymer composition as matrix material.

The polymer composition here is composed in essence of (meth)acrylate-based resin component 1 having hydroxy, amine and/or thiol groups, of resin component 2 comprising initiator or accelerator, and of an isocyanate component comprising di- or polyisocyanates which have been internally capped and/or have been capped with capping agents. Resin component 1 here comprises from 20 to 70% by weight of monomers and from 10% by weight to 50% by weight of prepolymers.

It is particularly preferable that the quantitative ratio of resin component 1 to isocyanate coponent is from 90:10 to 50:50.

It is very particularly preferable that resin component 1 and the isocyanate component are present in a ratio to one another such that the number of uretdione groups and/or externally capped isocyanate groups of the isocyanate component for each hydroxy group of resin component 1 is from 0.3 to 1.0, preferably from 0.6 to 0.9, particularly preferably from 0.45 to 0.55.

In relation to resin components 1 and 2, there are two different embodiments. In the first embodiment, resin component 1 is at least composed of from 0% by weight to 30% by weight of crosslinking agent,
from 30% by weight to 60% by weight of monomers,
from 1% by weight to 40% by weight, preferably
from 5 to 40% by weight, particularly preferably
from 10 to 40% by weight, of prepolymers,
from 0% by weight to 5% by weight of accelerator and
optionally further auxiliaries.

Resin component 2 simultaneously comprises—based on the amounts of resin component 1—from 0.5 to 7.0% by weight of initiator, preferably a peroxide.

In the second embodiment, resin component 1 is at least composed of from 0% by weight to 30% by weight of crosslinking agent,
from 30% by weight to 60% by weight of monomers,
from 1 to 40% by weight, preferably from 5 to 40%
by weight, particularly preferably 10 to 40% by weight, of prepolymers,
from 0.5 to 7.0% by weight of initiator, preferably a peroxide and
optionally further auxiliaries.

In this embodiment, resin component 2 simultaneously comprises—based on the amounts of resin component 1—from 0.1% by weight to 5% by weight of accelerator. In both embodiments, the initiator preferably comprises dilauroyl peroxide, permaleates and/or dibenzoyl peroxide and the accelerator preferably comprises a tertiary, aromatically substituted amine.

There can optionally also be from 0% by weight to 20% by weight of urethane (meth)acrylates in resin component 1, preferably up to 15% by weight.

The polymer compositions used according to the invention provide very good flow at low viscosity and therefore good impregnation capability and, in the hardened state, excellent chemicals resistance. Use of aliphatic crosslinking agents (e.g. IPDI or $H_{12}MDI$) and the use, according to the invention, of the functionalized poly(meth)acrylates also achieves good weathering resistance.

The composite semifinished products according to the invention are moreover very stable during storage under room-temperature conditions, generally for a number of weeks and even months, and they can therefore be further processed at any time to give composite components. This is the essential difference from the systems of the prior art, which are reactive and not stable during storage, because immediately after application they begin to react and therefore crosslink, for example to give polyurethanes.

The composite semifinished products which are stable during storage can then be further processed at a subsequent juncture to give composite components. Use of the composite semifinished products according to the invention gives very good impregnation of the fibrous substrate, because the liquid resin components, comprising the isocyanate component, wet the fibre of the substrate very effectively, and exposure of the polymer composition here to thermal stress, which can lead to onset of a second crosslinking reaction, is avoided by prior homogenization of the polymer composition, and the process steps of milling and sieving to give individual particle-size fractions are moreover omitted, thus permitting achievement of a higher yield of impregnated fibrous substrate.

Another great advantage of the composite semifinished products according to the invention is that this process of the invention does not require the high temperatures that are necessary at least for a short time during the melt-impregnation process or during the incipient sintering of pulverulent reactive polyurethane compositions.

Process

The invention provides not only the composite semifinished products or prepregs but also a process for producing the said composite semifinished products or prepregs and further processing of these to give mouldings or composite components. The said process is composed of the following process steps:

I. production of a reactive composition comprising resin components 1 and 2 and the isocyanate component, in each case according to the description that follows,
II. direct impregnation of the fibrous substrate according to the description that follows with the composition from I,
III. hardening of the resin components,
IV. shaping to give the subsequent moulding and
V. hardening of the isocyanate component.

Process step I can by way of example use simple stirring of the three components together. Once resin components 1 and 2 have been combined, these should be further processed within a period of 45 min., preferably within a period of 30 min. and particularly preferably within a period of 15 min. in process step II.

Process step II, the impregnation, uses saturation of the fibres, woven fabrics or laid scrims with the formulation produced in process step I. The impregnation preferably takes place at room temperature.

Process step III directly follows process step II. The hardening can be accelerated by increasing the temperature as far as 80° C. Care has to be taken here that the temperature is below the temperature required for process step V.

The composite semifinished products/prepregs produced according to the invention have very high stability during storage at room temperature after process step III or IV. As a function of reactive polyurethane composition present, they can be stored for at least some days at room temperature, but the composite semifinished products can generally be stored for a number of weeks at a temperature equal to or below 40° C., and at room temperature can even be stored for a number years. The resultant prepregs are not tacky and therefore have very good handling properties and very good further-processing properties. The reactive or highly reactive polyurethane compositions used according to the invention therefore exhibit very good adhesion on, and distribution on, the fibrous substrate.

In process step IV, the resultant composite semifinished products/prepregs can, if necessary, be combined and cut to size to give various shapes. In particular, they can be cut to size, and optionally sewn or fixed by other means, in order to consolidate a number of composite semifinished products to give a single composite, prior to final crosslinking of the matrix material to give the matrix.

In process step V, the final hardening of the composite semifinished products takes place to give mouldings crosslinked to give thermosets. This takes place through thermal hardening involving the hydroxy groups of resin component 1 with the isocyanate component.

For the purposes of this invention, the said procedure of production of the composite components from the prepregs takes place, as a function of hardening time, at temperatures above about 160° C. when reactive matrix materials are used (variant I), or at temperatures above 100° C. when highly reactive matrix materials provided with appropriate catalysts are used (variant II).

In process step V, the composite semifinished products can be pressed in a suitable mould under pressure and optionally with application of vacuum.

The reactive polyurethane compositions used according to the invention are hardened under normal conditions, e.g. with DBTL catalysis, starting at 160° C., and usually starting at about 180° C. The reactive polyurethane compositions used according to the invention provide very good flow and therefore good impregnation capability, and in the hardened state exhibit excellent chemicals resistance. When aliphatic crosslinking agents (e.g. IPDI or $H_{12}MDI$) are used, good weathering resistance is also achieved.

When the invention uses the isocyanate component which is highly reactive and therefore cures at low temperature, the hardening temperature of from 100 to 160° C. not only permits saving of energy and hardening time but also permits use of many heat-sensitive substrates.

For the purposes of this invention, highly reactive (variant II) means that the polyurethane compositions which comprise uretdione groups and which are used according to the invention harden at temperatures of 100 to 160° C., where this specifically depends on the nature of the substrate. The said hardening temperature is preferably from 120 to 150° C., particularly preferably from 130 to 140° C. The hardening time of the polyurethane composition used according to the invention is within the range from 5 to 60 minutes.

Substrates

The substrate material in the composite semifinished product is characterized in that the fibrous substrates are mostly composed of glass, of carbon, of plastics, such as polyamide (aramid) or polyester, of natural fibres, or of mineral fibre materials such as basalt fibres or ceramic fibres. The fibrous substrates take the form of textile sheets made of non-woven, or of knitted fabrics, or of non-knitted structures such as woven fabrics, laid scrims or braided fabrics, in the form of long-fibre materials or of short-fibre materials.

A detailed embodiment is as follows: the fibrous substrate in the present invention is composed of fibrous material (often also termed reinforcing fibres). Any material of which the fibres are composed is generally suitable, but it is preferable to use fibrous material made of glass, of carbon, of plastics, e.g. polyamide (aramid) or polyester, of natural fibres or of mineral fibre materials such as basalt fibres or ceramic fibres (oxidic fibres based on aluminium oxides and/or silicon oxides). It is also possible to use mixtures of fibre types, e.g. woven-fabric combinations made of aramid fibres and of glass fibres, or carbon fibres and glass fibres. Hybrid composite components can also be produced with prepregs made of various fibrous substrates.

Glass fibres are the most frequently used types of fibre, predominantly because they are relatively inexpensive. In principle, all types of glass-based reinforcing fibres are suitable here (fibres made of E glass, of S glass, of R glass, of M glass, of C glass, of ECR glass, of D glass, or of AR glass, or hollow glass fibres). Carbon fibres are generally used in high-performance composite materials, where another important factor is that the density is lower than that of glass fibre while strength is high. Carbon fibres are industrially produced fibres made of carbon-containing starting materials, which are converted through pyrolysis into carbon arranged in graphite-like form. A distinction is made between isotropic and anisotropic types: isotropic fibres have only low strengths and are of less industrial importance; anisotropic fibres exhibit high strengths and stiffnesses together with low tensile strain at break. The expression natural fibres here means any textile fibres and fibre materials which are obtained from vegetable or animal material (e.g. fibres made of wood, of cellulose, of cotton, of hemp, of jute, of linen, of sisal, or of bamboo). Aramid fibres have a negative coefficient of thermal expansion, i.e. become shorter on heating, and this is also true of carbon fibres. The specific strength of aramid fibres, and their modulus of elasticity, are markedly lower than those of carbon fibres. Combination with the positive coefficient of expansion of the matrix resin can lead to manufacture of components with high dimensional stability. The compressive strength of aramid-fibre composite materials is markedly less than that of carbon-fibre-reinforced plastics. Known trademarks for aramid fibres are Nomex® and Kevlar® from DuPont, or Teijinconex®, Twaron® and Technora® from Teijin. Particularly suitable and preferred are substrates made of glass fibres, carbon fibres, aramid fibres or ceramic fibres. The fibrous material comprises a textile sheet. Suitable materials are textile sheets made of non-woven; knitted fabrics are equally suitable, as also are non-knitted structures such as woven fabrics, laid scrims or braided fabrics. A distinction is also made between long-fibre materials and short-fibre materials as substrates. Rovings and yarns are equally suitable according to the invention. All of the materials mentioned are suitable as fibrous substrates for the purposes of the invention. An overview of reinforcing fibres is found in "Composites Technologien" [Technologies of composites], Paolo Ermanni (Version 4), lecture script, ETH Zürich, August 2007, Chapter 7.

Isocyanate components

Di- and polyisocyanates which have been capped with capping agents or which have been internally capped (uretdione) are used as isocyanate component.

The di- and polyisocyanates used according to the invention can be composed of any desired aromatic, aliphatic, cycloaliphatic and/or (cyclo)aliphatic di- and/or polyisocyanates. DE 102010030234.1 gives a list of possible di- and polyisocyanates, and also reagents for external capping thereof.

In a first embodiment, the polyisocyanates used according to the invention have been externally capped. External capping agents can be used for this purpose, and examples can be found in DE 102010030234.1. IPDI adducts are the preferred hardener component used, where these comprise isocyanurate groups and ε-caprolactam-capped isocyanate structures. Preferred capping agents are those selected from ethyl acetoacetate, diisopropylamine, methyl ethyl ketoxime, diethyl malonate, ε-caprolactam, 1,2,4-triazole, phenol or substituted phenols and/or 3,5-dimethylpyrazole.

In a second, preferred embodiment, the isocyanate components are present with internal capping. The internal capping takes place by way of dimer formation by way of uretdione structures, where these cleave at elevated temperature to regenerate the isocyanate structures initially present, and thus initiate the crosslinking with the binder.

Polyisocyanates comprising uretdione groups are well known and are described by way of example in U.S. Pat. No. 4,476,054, U.S. Pat. No. 4,912,210, U.S. Pat. No. 4,929,724 and EP 417 603. A comprehensive overview of industrially relevant processes for dimerizing isocyanates to give uretdiones is given in J. Prakt. Chem. 336 (1994) 185-200. The reaction of isocyanates to give uretdiones generally takes place in the presence of soluble dimerization catalysts, e.g. dialkylaminopyridines, trialkylphosphines, phosphorous triamides or imidazoles. The rection—carried out optionally in solvents but preferably in the absence of solvents—is terminated by addition of catalyst poisons on reaching a desired conversion. Excess monomeric isocyanate is then removed by molecular evaporation. If the catalyst is sufficiently volatile, the reaction mixture can be freed from the catalyst during the course of monomer removal. In this case it is possible to omit the addition of catalyst poisons. In principle, there is a wide range of isocyanates suitable for the production of polyisocyanates comprising uretdione groups. The abovementioned di- and polyisocyanates can be used.

Both for the embodiment involving the externally capped isocyanates and for the embodiment involving the uretdiones, preference is given to di- and polyisocyanates made of any desired aliphatic, cycloaliphatic and/or (cyclo)aliphatic di- and/or polyisocyanates. The following are used according to the invention: isophorone diisocyanate (IPDI), hexamethylene diisocyanate (HDI), diisocyanatodicyclohexylmethane ($H_{12}$MDI), 2-methylpentane diisocyanate (MPDI), trimethylhexamethylene 2,2,4-diisocyanate/trimethylhexamethylene 2,4,4-diisocyanate (TMDI) and norbornane diisocyanate (NBDI). It is very particularly preferable to use IPDI, HDI, TMDI and $H_{12}$MDI and it is also possible here to use the isocyanurates.

It is very particularly preferable to use IPDI and HDI for the matrix material. The reaction of these polyisocyanates comprising uretdione groups to give hardeners a) comprising uretdione groups includes the reaction of the free NCO groups with polymers or monomers comprising hydroxy groups, examples being polyesters, polythioethers, polyethers, polycaprolactams, polyepoxides, polyesteramides, polyurethanes and low-molecular-weight di-, tri- and/or tetraalcohols as chain extenders and optionally monoamines and/or monoalcohols as chain terminators, and has been frequently described (EP 669 353, EP 669 354, DE 30 30 572, EP 639 598 or EP 803 524).

Preferred hardeners a) having uretdione groups have free NCO content less than 5% by weight and from 3 to 25% by weight, preferably from 6 to 18% by weight, content of uretdione groups (calculated as $C_2N_2O_2$, molecular weight 84). Preference is given to polyesters and monomeric dialcohols. The hardeners can also have isocyanurate structures, biuret structures, allophanate structures, urethane structures and/or urea structures, apart from the uretdione groups.

The isocyanate components can optionally comprise an additional amount of from 0.1 to 5.0% by weight of catalysts. These comprise organometallic catalysts, e.g. dibutyltin dilaurate (DBTL), tin octoate, bismuth neodecanoate, or else tertiary amines, e.g. 1,4-diazabicyclo[2.2.2]octane, in amounts of from 0.001 to 1% by weight. These reactive polyurethane compositions used according to the invention are hardened starting at 160° C., usually starting at about 180° C., under normal conditions, e.g. with DBTL catalysis.

The isocyanate component is solid below 40° C. and liquid above 125° C. The isocyanate component can optionally comprise other auxiliaries and additives known from polyurethane chemistry.

In relation to the embodiment comprising uretdione, the isocyanate component has less than 5% by weight free NCO content and has from 3 to 25% by weight uretdione content.

The isocyanate composition of the said embodiment can moreover comprise from 0.1 to 5% by weight, preferably from 0.3 to 2% by weight, of at least one catalyst selected from quaternary ammonium salts, preferably tetraalkylammonium salts, and/or quaternary phosphonium salts having halogens, hydroxides, alcoholates or organic or inorganic acid anions as counterion, and from 0.1 to 5% by weight, preferably from 0.3 to 2% by weight, of at least one co-catalyst selected from either at least one epoxide and/or at least one metal acetylacetonate and/or quaternary ammonium acetylacetonate and/or quaternary phosphonium acetylacetonate. All of the quantitative data relating to the (co-)catalysts are based on the entire formulation of the matrix material.

DE 102010030234.1 gives examples of the catalysts. The said catalysts can be added alone or in a mixture. It is preferable to use tetraethylammonium benzoate and tetrabutylammonium hydroxide.

The isocyanate component can moreover also comprise from 0.1 to 5.0% by weight of at least one co-catalyst.

Co-catalysts used on the one hand comprise epoxides. Examples of those that can be used here are glycidyl ethers and glycidyl esters, aliphatic epoxides, and diglycidyl ethers based on bisphenol A and glycidyl methacrylates. Examples of epoxides of this type are triglycidyl isocyanurate (TGIC, trade name ARALDITE 810, Huntsman), mixtures made of diglycidyl terephthalate and triglycidyl trimellitate (trade name ARALDITE PT 910 and 912, Huntsman), glycidyl esters of Versatic acid (trade name KARDURA E10, Shell), 3,4-epoxycyclohexylmethyl 3',4'-epoxycyclohexanecarboxylate (ECC), diglycidyl ethers based on bisphenol A (trade name EPIKOTE 828, Shell), ethylhexyl glycidyl ether, butyl glycidyl ether, pentaerythritol tetraglycidyl ether (trade name POLYPDX R 16, UPPC AG), and also other Polypox types having free epoxy groups. It is also possible to use mixtures. It is preferable to use ARALDITE PT 910 and 912.

Metal acetylacetonates can alternatively be used as co-catalysts. Examples of these are zinc acetylacetonate, lithium acetylacetonate and tin acetylacetonate, alone or in a mixture. It is preferable to use zinc acetylacetonate. Other co-catalysts that can be used are quaternary ammonium acetylacetonates or quaternary phosphonium acetylacetonates. DE 102010030234.1 gives examples of these. It is particularly preferable to use tetraethylammonium acetylacetonate and tetrabutylammonium acetylacetonate. Mixtures of these catalysts can of course also be used.

It is possible to achieve wide variation of not only the rate of the crosslinking reaction during production of the composite components but also the properties of the matrix as a function of the constitution of the reactive or highly reactive isocyanate component used and of optionally added catalysts.

The isocyanate component can also optionally comprise other auxiliaries and additives known from polyurethane chemistry.

Resin Components

Resin components used according to the invention comprise 2C reactive resins based on methacrylate and composed of a first and a second resin component.

The first resin component used according to the invention has the following constitution:

20% by weight to 70% by weight, preferably 30% by weight to 60% by weight and more preferably 30% by weight to 40% by weight of monomers, preferably (meth)acrylates and/or components copolymerizable with (meth)acrylates, 10% by weight to 50% by weight, preferably 15% by weight to 40% by weight of prepolymers, and 0% by weight to 5% by weight of accelerators.

In addition there may also be further components optionally present. As auxiliaries and additives it is possible additionally to use chain-transfer agents, plasticizers, stabilizers and/or inhibitors. Furthermore, it is possible to add dyes, fillers, wetting agents, dispersants, flow control assistants, adhesion promoters, UV stabilizers, defoamers and rheological additives. The first resin component may in particular comprise the following additional constituents:

0% by weight to 30% by weight of crosslinkers, preferably selected from the group consisting of dimethacrylates, 0% by weight to 20% by weight of urethane (meth)acrylates.

Critical for the present invention is that the monomers and/or prepolymers from resin component 1 contain functional groups. Suitable as such functional groups are hydroxy groups, amino groups and/or thiol groups, which undergo addition reaction with the free isocyanate groups, and/or uretdione groups, from the isocyanate component, and thus additionally crosslink and harden. Resin component 1 has an OH number of 10 to 100, preferably of 20 to 500 mg, more preferably of 20 to 150 mg KOH/gram.

The amount of the functional groups is selected in particular such that for each functional group in the resin components there are 0.6 to 2.0 isocyanate equivalents or 0.3 to 1.0, preferably 0.45 to 0.55, uretdione groups in the isocyanate component.

The second resin component is composed of a mixture comprising one or more initiators. Relative to the first resin component, there is 0.1% by weight to 10% by weight, preferably 0.5% by weight to 7% by weight and more preferably 1% by weight to 5% by weight of initiator. Generally speaking, the peroxide in the second resin component is admixed with a diluent, for example with a phthalate such as dibutyl phthalate, an oil or another plasticizer.

Serving as polymerization initiators in particular are peroxides or azo compounds. In certain circumstances it may be advantageous to use a mixture of different initiators. Finding preferred use are halogen-free peroxides such as permaleates, dilauroyl peroxide, dibenzoyl peroxide, tert-butyl peroctoate, di(tert-butyl) peroxide (DTBP), di(tert-amyl) peroxide (DTAP), tert-butylperoxy 2-ethylhexyl carbonate (TBPEHC), and other peroxides with high-temperature decomposition, as free-radical initiator. Particularly preferred initiators are dilauroyl peroxide and dibenzoyl peroxide.

One particular embodiment of a redox initiator system for the initiator-containing reactive-resin component is a combination of peroxides and accelerators, more particularly amines, which in general are present in resin component 1. Said amines may include, for example, tertiary, aromatically substituted amines, such as, more particularly, N,N-dimethyl-p-toluidine, N,N-bis(2-hydroxyethyl)-p-toluidine and N,N-bis(2-hydroxypropyl)-p-toluidine. The reactive resin according to the invention may contain up to 7% by weight, preferably up to 5% by weight and very preferably up to 3% by weight of an accelerator.

In an alternative embodiment of a 2C resin system, the accelerator is present in the second component, for example in a diluent, and the initiator, the peroxide for example, is a constituent of the reactive resin of the invention.

The monomers present in the reactive resin are compounds selected from the group of the (meth)acrylates such as, for example, alkyl (meth)acrylates of straight-chain, branched or cycloaliphatic alcohols having 1 to 40 C atoms, such as, for example, methyl (meth)acrylate, ethyl (meth)acrylate, n-butyl (meth)acrylate and 2-ethylhexyl (meth)acrylate.

Also suitable as constituents of monomer mixtures are additional monomers having a further functional group, such as α,β-unsaturated monocarboxylic or dicarboxylic acids, examples being acrylic acid, methacrylic acid or itaconic acid; esters of acrylic acid or methacrylic acid with dihydric alcohols, examples being hydroxyethyl (meth)acrylate and hydroxypropyl (meth)acrylate; acrylamide or methacrylamide; or dimethylaminoethyl (meth)acrylate. Other suitable constituents of monomer mixtures are, for example, glycidyl (meth)acrylate and silyl-functional (meth) acrylates.

Besides the aforementioned (meth)acrylates, the monomer mixtures may also contain further unsaturated monomers which are copolymerizable with the aforementioned (meth)acrylates and by means of free-radical polymerization. These include, among others, 1-alkenes and styrenes.

One optional constituent of the reactive resin according to the invention is the crosslinkers. These are in particular polyfunctional methacrylates such as allyl (meth)acrylate. Particularly preferred are di- or tri-(meth)acrylates such as, for example, 1,4-butanediol di(meth)acrylate, tetraethylene glycol di(meth)acrylate, triethylene glycol di(meth)acrylate or trimethylolpropane tri(meth)acrylate.

In each specific case, the composition of the monomers in terms of proportions and composition will be selected expediently in light of the desired technical function and the substrate material that is to be wetted.

The monomer fraction of the reactive resin here is between 20% by weight and 70% by weight, preferably between 30% by weight and 60% by weight and more preferably between 30% by weight and 40% by weight.

Resin component 1 comprises what are called MO-PO systems. These systems, in addition to the monomers recited, also include polymers, preferably polyesters or poly(meth)acrylates, which in order to distinguish them more effectively in the context of this patent are referred to as prepolymers. They are used in order to improve the polymerization properties, the mechanical properties, the adhesion to the substrate material, the adjustment of viscosity in processing and wetting of the substrate material with the resin, and also the optical requirements to which the resins are subject. The prepolymer fraction of the reactive resin in this case is between 10% by weight and 50% by weight, preferably between 15% by weight and 40% by weight. Not only the polyesters but also the poly(meth)acrylates may have additional functional groups for promoting adhesion or for copolymerization in the crosslinking reaction, in the form of double bonds, for example. The prepolymers preferably contain hydroxyl, amino or thio groups.

Said poly(meth)acrylates are generally composed of the same monomers as already listed for the monomers in the resin system. They may be obtained by solution, emulsion, suspension, bulk or precipitation polymerization, and are added as the pure substance to the system.

Said polyesters are obtained in bulk via polycondensation or ring-opening polymerization, and are composed of the building blocks that are known from these applications.

Chain-transfer agents used can comprise any of the compounds known from free-radical polymerization. It is preferable to use mercaptans, such as n-dodecyl mercaptan.

Conventional UV stabilizers can also be used. The UV stabilizers are preferably selected from the group of the benzophenone derivatives, benzotriazole derivatives, thioxanthonate derivatives, piperidinolcarboxylic ester derivatives and cinnamic ester derivatives.

From the group of the stabilizers and inhibitors it is preferable to use substituted phenols, hydroquinone derivatives, phosphines and phosphites.

Preferred rheology additives used are polyhydroxycarboxamides, urea derivatives, salts of unsaturated carboxylic esters, alkylammonium salts of acidic phosphoric acid derivatives, ketoximes, amine salts of p-toluenesulphonic acid, amine salts of sulphonic acid derivatives, or else aqueous or organic solutions or mixtures of the compounds. Rheology additives that have been found to be particularly suitable are those based on fumed or precipitated, optionally also silanized, silicas with BET surface area from 10 to 700 nm$^2$/g.

Defoamers are preferably selected from the group of the alcohols, hydrocarbons, paraffin-based mineral oils, glycol derivatives, derivatives of glycolic esters, of acetic esters and of polysiloxanes.

Other Constituents of the Prepregs

The composite semifinished products can also comprise other additives in addition to resin components 1 and 2, the substrate material and the isocyanate component. It is therefore possible to add a total amount of from 0.05 to 5% by weight of, for example, light stabilizers such as sterically hindered amines, or other auxiliaries, for example those described in EP 669 353. Fillers and pigments, e.g. titanium dioxide, can be added in an amount of up to 30% by weight of the entire composition. Additives such as flow aids, e.g. polysilicones, or adhesion promoters, e.g. those based on acrylate, can moreover be added to produce the reactive polyurethane compositions according to the invention.

Additional catalysts for the second hardening process can optionally be present in the composite semifinished products according to the invention. These comprise organometallic catalysts, e.g. dibutyltin dilaurate, zinc octoate, bismuth neodecanoate, or else tertiary amines, e.g. 1,4-diazabicyclo [2.2.2]octane, in amounts of from 0.001 to 1.0% by weight. These reactive polyurethane compositions used according to the invention are hardened under normal conditions, e.g.

with DBTL catalysis, at temperatures starting at 160° C., usually at temperatures starting at about 180° C., and are termed variant I.

For the purposes of this invention, reactive (variant I) means that the second hardening process takes place at temperatures starting at 160° C., specifically as a function of the substrate. The second hardening process takes place under normal conditions, e.g. with DBTL catalysis, starting at 160° C., usually starting at about 180° C. The time for the second hardening process is generally within the range from 5 to 60 minutes.

The invention also provides the use of the prepregs, in particular with fibrous substrates made of glass fibres, of carbon fibres or of aramid fibres.

The invention also provides the use of the prepregs produced according to the invention for producing composites in boatbuilding and shipbuilding, in aerospace technology, in automobile construction, for two-wheeled vehicles, preferably motorcycles and pedal cycles, or in the automotive, construction, medical technology, sports, or electrical/electronics-industry sectors, or in energy-generation systems, for example for rotor blades in wind-power systems.

The invention also provides the mouldings and, respectively, composite components which are produced from the prepregs or composite semifinished products produced according to the invention, and which are composed of at least one fibrous substrate and at least one crosslinked reactive composition, preferably one crosslinked reactive composition comprising uretdione groups, comprising a (meth)acrylate resin as matrix.

The invention claimed is:

1. A prepreg, consisting of a fibrous substrate impregnated with a reactive or highly reactive polymer composition as a matrix material,
    wherein the reactive or highly reactive polymer composition comprises:
        at least one (meth)acrylate-based resin comprising at least one of a hydroxyl group, an amine group, or a thiol group;
        at least one initiator and/or accelerator; and
        at least one di- or polyisocyanate which has been internally capped, capped with a capping agent, or a combination thereof,
    wherein the (meth)acrylate-based resin comprises from 20% by weight to 70% by weight of at least one (meth)acrylate monomer and from 1% by weight to 50% by weight of at least one prepolymer;
    wherein the di- or polyisocyanate is isophorone diisocyanate (IPDI), hexamethylene diisocyanate (HDI), diisocyanatodicyclohexylmethane ($H_{12}$MDI), 2-methylpentane diisocyanate (MPDI), trimethylhexamethylene 2,2,4-diisocyanate/trimethylhexamethylene 2,4,4-diisocyanate (TMDI), norbornane diisocyanate (NBDI), an isocyanurate, or any combination thereof.

2. The prepreg of claim 1, wherein a weight ratio of the (meth)acrylate-based resin to the di- or polyisocyanate is from 90:10 to 50:50.

3. The product of claim 1, wherein the (meth)acrylate-based resin comprises:
    from 0% by weight to 30% by weight of at least one crosslinking agent,
    from 30% by weight to 60% by weight of the (meth)acrylate monomer, and
    from 5% by weight to 40% by weight of the prepolymer.

4. The prepreg of claim 1, wherein the (meth)acrylate-based resin comprises:
    from 0% by weight to 30% by weight of at least one crosslinking agent,
    from 30% by weight to 60% by weight of the (meth)acrylate monomer,
    from 0% by weight to 20% by weight of at least one urethane (meth)acrylate, and
    from 5% by weight to 40% by weight of the prepolymer.

5. The prepreg of claim 1, wherein the reactive or highly reactive polymer composition further comprises (1) at least one initiator selected from the group consisting of dilauroyl peroxide, a permaleate, dibenzoyl peroxide, or any combination thereof and (2) at least one accelerator selected from the group consisting of tertiary, aromatically substituted amines.

6. The prepreg of claim 1, wherein the fibrous substrate comprises glass, carbon, plastic, natural fiber or a mineral fiber material.

7. The prepreg of claim 6, wherein the fibrous substrate is a textile sheet comprising a non-woven fabric, a knitted fabric, or a non-knitted structure, and wherein the fibrous substrate is a long-fiber material or a short-fiber material.

8. A prepreg, consisting of a fibrous substrate impregnated with a reactive or highly reactive polymer composition as a matrix material,
    wherein the reactive or highly reactive polymer composition comprises:
        at least one (meth)acrylate-based resin comprising at least one of a hydroxyl group, an amine group, or a thiol group;
        at least one initiator and/or accelerator; and
        at least one di- or polyisocyanate which has been internally capped, capped with a capping agent, or a combination thereof,
    wherein the (meth)acrylate-based resin comprises from 20% by weight to 70% by weight of at least one (meth)acrylate monomer and from 1% by weight to 50% by weight of at least one prepolymer;
    wherein the di- or polyisocyanate has been capped with at least one of ethyl acetoacetate, diisopropylamine, methyl ethyl ketoxime, diethyl malonate, ε-caprolactam, 1,2,4-triazole, phenol, substituted phenol and 3,5-dimethylpyrazole.

9. The prepreg of claim 1, wherein the reactive or highly reactive polymer composition further comprises from 0.1 to 5.0% by weight of at least one catalyst.

10. The prepreg of claim 1, wherein the di- or polyisocyanate which has been internally capped, capped with a capping agent or a combination thereof is a uretdione produced from isophorone diisocyanate (IPDI), hexamethylene diisocyanate (HDI), diisocyanatodicyclohexylmethane ($H_{12}$MDI), 2-methylpentane diisocyanate (MPDI), trimethylhexamethylene 2,2,4-diisocyanate/trimethylhexamethylene 2,4,4-diisocyanate (TMDI), norbornane diisocyanate (NBDI), or any combination thereof.

11. A prepreg, consisting of a fibrous substrate impregnated with a reactive or highly reactive polymer composition as a matrix material,
    wherein the reactive or highly reactive polymer composition comprises:
        at least one (meth)acrylate-based resin comprising at least one of a hydroxyl group, an amine group, or a thiol group;
        at least one initiator and/or accelerator; and
        at least one di- or polyisocyanate which has been internally capped, capped with a capping agent, or a combination thereof, wherein the (meth)acrylate-based resin comprises from 20% by weight to 70% by weight of at least one (meth)acrylate monomer and from 1% by weight to 50% by weight of at least one prepolymer;

wherein the di- or polyisocyanate which has been internally capped, capped with a capping agent is solid below 40° C. and liquid above 125° C., and has less than 5% by weight free NCO content and has from 3 to 25% by weight uretdione content.

12. The prepreg of claim 1, wherein the reactive or highly reactive polymer composition further comprises from 0.1 to 5% by weight of at least one catalyst selected from the group consisting of a quaternary ammonium salt and a quaternary phosphonium salt, and wherein the catalyst comprises a halogen, hydroxide, alcoholate, or organic or inorganic acid anion as a counterion.

13. The prepreg of claim 1, wherein the reactive or highly reactive polymer composition further comprises 0.1 to 5% by weight of at least one co-catalyst, selected from the group consisting of an epoxide, a metal acetylacetonate, a quaternary ammonium acetylacetonate, a and quaternary phosphonium acetylacetonate.

14. The prepreg of claim 1, wherein the (meth)acrylate-based resin contains hydroxyl groups and wherein the ratio of a number of uretdione groups, externally capped isocyanate groups, or both of the isocyanate component to the number of hydroxy groups of the (meth)acrylate-based resin is at least 0.3:1 and at most 1.0:1.

15. A method of preparing the prepreg of claim 1, comprising:

impregnating the fibrous substrate with the reactive or highly reactive polymer composition.

16. The method of claim 15, further comprising:
hardening the (meth)acrylate-based resin,
shaping the prepreg to obtain a molding, and
hardening the di- or polyisocyanate which has been internally capped, capped with a capping agent, or a combination thereof.

17. The method of claim 15, wherein the di- or polyisocyanate is isophorone diisocyanate (IPDI), hexamethylene diisocyanate (HDI), diisocyanatodicyclohexylmethane ($H_{12}$MDI), 2-methylpentane diisocyanate (MPDI), trimethylhexamethylene 2,2,4-diisocyanate/trimethylhexamethylene 2,4,4-diisocyanate (TMDI), norbornane diisocyanate (NBDI), an isocyanurate, or any combination thereof.

18. The method of claim 15, wherein the hardening the isocyanate component is at a temperature of from 60 to 120° C.

19. A molding obtained by crosslinking the reactive or highly reactive polymer composition in the prepreg of claim 1.

* * * * *